(12) United States Patent
Marenco et al.

(10) Patent No.: US 8,681,219 B2
(45) Date of Patent: Mar. 25, 2014

(54) SYSTEM AND METHOD FOR DRIVING ASSISTANCE AT ROAD INTERSECTIONS

(75) Inventors: Daniele Marenco, Venaria Reale (IT); Denis Bollea, Turin (IT)

(73) Assignee: Magneti Marelli S.p.A., Corbetta, Milan (IT)

( * ) Notice: Subject to any disclaimer, the term of this patent is extended or adjusted under 35 U.S.C. 154(b) by 823 days.

(21) Appl. No.: 12/767,600

(22) Filed: Apr. 26, 2010

(65) Prior Publication Data

US 2010/0271720 A1 Oct. 28, 2010

(30) Foreign Application Priority Data

Apr. 27, 2009 (EP) .................................... 09425157

(51) Int. Cl.
*H04N 7/18* (2006.01)
(52) U.S. Cl.
USPC ............ 348/148; 348/113; 348/118; 348/149
(58) Field of Classification Search
USPC .................... 348/113, 118, 148, 149
See application file for complete search history.

(56) References Cited

U.S. PATENT DOCUMENTS

| | | | | |
|---|---|---|---|---|
| 6,014,814 A * | 1/2000 | Imbert et al. | ...................... | 33/228 |
| 6,115,652 A * | 9/2000 | Sato et al. | ......................... | 701/28 |
| 6,414,712 B1 * | 7/2002 | Wanielik et al. | .............. | 348/118 |
| 6,422,706 B1 * | 7/2002 | Rangan | .......................... | 359/857 |
| 6,501,371 B2 * | 12/2002 | Munch | ........................... | 340/436 |
| 6,527,399 B1 * | 3/2003 | Palathingal | .................... | 359/866 |
| 6,775,606 B1 * | 8/2004 | Ertl et al. | ......................... | 701/49 |
| 2003/0117731 A1 * | 6/2003 | Platzer, Jr. | ..................... | 359/850 |
| 2005/0015203 A1 * | 1/2005 | Nishira | .......................... | 701/301 |
| 2005/0159862 A1 * | 7/2005 | Komori | ........................... | 701/36 |
| 2005/0240342 A1 * | 10/2005 | Ishihara et al. | ............... | 701/208 |
| 2006/0155444 A1 * | 7/2006 | Lee et al. | ......................... | 701/49 |
| 2007/0010938 A1 * | 1/2007 | Kubota et al. | ................. | 701/200 |
| 2007/0263301 A1 * | 11/2007 | Agrest | .......................... | 359/843 |
| 2008/0291276 A1 * | 11/2008 | Randler | ........................ | 348/149 |
| 2009/0216431 A1 * | 8/2009 | Vu et al. | ........................ | 701/201 |
| 2009/0299622 A1 * | 12/2009 | Denaro | ......................... | 701/201 |
| 2009/0310237 A1 * | 12/2009 | Shin et al. | ...................... | 359/843 |
| 2010/0157061 A1 * | 6/2010 | Katsman et al. | ............... | 348/149 |
| 2010/0315214 A1 * | 12/2010 | Yano et al. | ..................... | 340/435 |

FOREIGN PATENT DOCUMENTS

| | | | | |
|---|---|---|---|---|
| EP | 1 605 404 A2 | 12/2005 | | |
| JP | 2008-68827 | * 3/2008 | ............. | B60R 11/02 |
| JP | 2008-222153 | 9/2008 | | |
| WO | WO 2004/065176 A1 | 8/2004 | | |

* cited by examiner

*Primary Examiner* — Emmanuel L Moise
*Assistant Examiner* — Sarah Drabik
(74) *Attorney, Agent, or Firm* — Merchant & Gould P.C.

(57) ABSTRACT

Described herein is a system and a method for the automatic adjustment of rear-view devices of a vehicle travelling a lane or road, based on shooting scenes representing an environment surrounding the vehicle in the travel direction and on the identification of at least one from among a collection of predetermined shapes and indicia along the road indicating a road intersection between the lane or road traveled by the vehicle and an incident lane or road, whereby the movement of at least one rear-view device is actuated for representing to the driver a rear and side scene with respect to the vehicle comprising the incident lane or road.

15 Claims, 6 Drawing Sheets

SYSTEM AND METHOD FOR DRIVING ASSISTANCE AT ROAD INTERSECTIONS

FIELD OF THE INVENTION

The present invention generally regards vehicle driving assistance systems, and more specifically a system and method for automatic adjustment of vehicle rear-view means intended to serve as a driving assistance at road intersections.

BACKGROUND OF THE INVENTION

Road intersections represent critical points of a road system due to the interferences that occur between various traffic streams. Thus, there arises various problems on the roads regarding traffic safety and circulation regularity.

At a road intersection, a vehicle performs various manoeuvres, among which changing speed and/or direction, which cannot be performed freely, due to the presence of other vehicles. In particular, when joining the traffic stream (active entry) the driver of the vehicle joining the traffic stream must make sure he has enough space between the vehicles transiting in the traffic stream. The drivers of the vehicles transiting in the main traffic stream of a road or lane must be in turn able to control the manoeuvre of the other vehicles joining the traffic stream (passive entry).

For the safe operation of the road intersections the vehicles nearing a road intersection or about to perform a manoeuvre to join the traffic stream should be able to mutually see each other hence adjust their driving conduct according to the regulation modes of the road intersection itself.

Use of special acceleration or entry lanes on at-grade or raised intersections, provided with interchanges, eases traffic flow drawbacks deriving from manoeuvres to join the traffic stream. In this case, the junction region between the specialised manoeuvre lane (entry lane) and the main lane or road to which the entry lane is joined tangentially—the region where the manoeuvre to join the traffic stream is performed—comprises a parallel section and a junction section.

The entry of the vehicle into the main traffic stream, towards a destination direction, occurs along a variable direction of manoeuvre and ends along a direction of joining the traffic stream incident with the destination direction according to an acute angle.

This causes difficulties for the driver, who must check the traffic approaching from behind with respect to the direction he is travelling to join the traffic stream with the assistance of the vehicle rear-view means, typically internal and external rear-view mirrors or one or more video cameras, given that he cannot have a direct view turning his head, as he would do in common perpendicular intersections.

However, in this case, the rear-view means are not always oriented in such a manner to show an image including the lane or destination road, making the driving condition still hazardous.

The current systems for picking up scenes of the environment surrounding the vehicle (for example the driving assistance systems for blind spot monitoring, BSM) do little to overcome such drawbacks in that they are complex systems arranged to acoustically warn the driver or which require the driver to look away, when naturally looking at the rear-view mirror, to project the image of interest elsewhere, typically on the windscreen, on the dashboard or on the instrument panel.

SUMMARY OF THE INVENTION

Therefore, the present invention has the object of providing a satisfactory solution to the problems described above providing a system for automatic adjustment of the rear-view means of a vehicle at road intersections, and a respective vehicle driving assistance system, capable of allowing an optimal view of the environment surrounding the vehicle when joining the destination road and in particular when joining a traffic stream present in the destination road.

According to the present invention such object is obtained thanks to a system for automatically adjusting the vehicle rear-view mirrors, having the characteristics referred to in claim 1.

Particular embodiments are the subject of the dependent claims, whose contents shall be deemed an integral or integrating part of the present description.

In addition, a method for automatic adjustment of vehicle rear-view means as claimed form the subject of the invention.

BRIEF DESCRIPTION OF THE DRAWINGS

Further characteristics of the invention shall be outlined further in the subsequent detailed description of an embodiment thereof, provided for exemplifying and non-limiting purposes, with reference to the attached drawings, wherein.

DETAILED DESCRIPTION OF A PREFERRED EMBODIMENT

Figure 1:
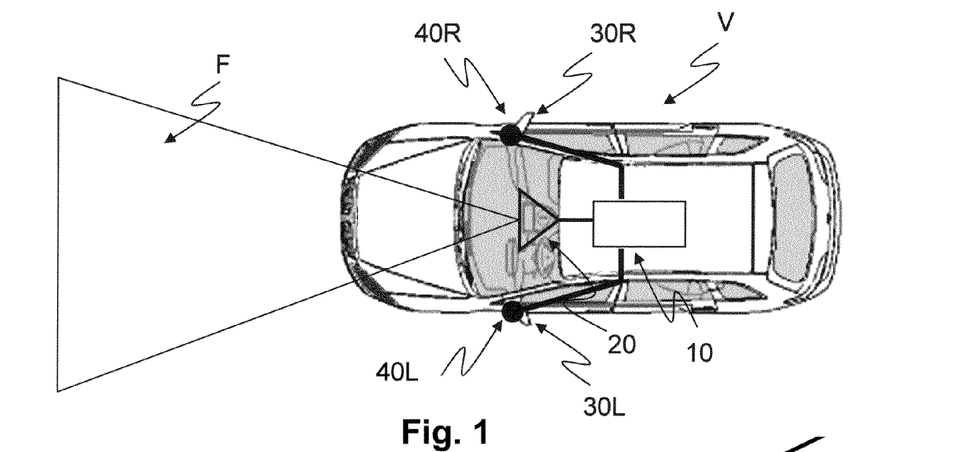
FIG. 1 is a schematic representation of a vehicle provided with a system subject of the invention.

A vehicle V provided with a system for the automatic adjustment of rear-view means at a road intersection is schematically shown in FIG. 1.

An on board processing unit 10 supervises the control of shooting means 20, for example one or more video cameras, preferably installed at the front part of the vehicle or facing the travel direction of the vehicle and arranged for shooting scenes representing an environment surrounding the vehicle.

F is used to indicate the field of view of the shooting means, herein solely indicatively represented symmetric with respect to the longitudinal axis of the vehicle. The width of the horizontal field of view is preferably comprised between 40° and 100°. The depth of the field of view on the road surface is preferably in the order of 50 m and not lower than 30 m. Obviously, the field of view F may be fixed or variable, for example automatically variable during an operation for detecting and tracking a manoeuvre to join the traffic stream, as better described hereinafter.

30 is used to generally indicate the vehicle rear-view means, whose orientation is controlled automatically for the purposes of assisting the driver in the manoeuvre of entering an intersection by the system subject of the invention.

In the description hereinafter the term "rear-view means" is used to indicate any device adapted to represent to the driver a scene of the rear or mainly rear environment, with respect to the vehicle. Typically, they are represented by a plurality of rear-view mirrors, respectively a first external rear-view mirror on a first side of the vehicle near the driver, a second external rear-view mirror on the opposite side of the vehicle remote from the driver and possibly a central internal rear-view mirror for vehicles that allow rear view through a rear window. Alternatively, the rear-view means might be obtained through video cameras or like shooting means, located in place of, or alongside, rear-view mirrors or installed on other parts of the body of the vehicle, facing the lateral and/or rear side with respect to the same.

Regarding a rear-view mirror device it is possible to identify at least one axis or normal direction (N in FIG. 2), with respect to which the images of a rear or at least partially lateral scene are reflected to the driver. The adjustable orientation of the mirror i.e. of its axis, in the space allows modifying the picked up scene and its representation to the driver.

Regarding a rear-view video camera device (not shown) it is possible to identify shooting means and separate display means. The shooting means have an optical axis, defined with respect to which is a field of view for capturing the images. The display means for representing images of a scene subject of the shooting to the driver may also be remotely located with respect to the shooting means, usually, according to the pre-defined fixed orientation to meet needs regarding ergonomic optimisation. In this case, it is the adjustable orientation of the optical axis of the shooting means in the space that allows modifying the area for picking up the images.

The on board processing unit 10 is further coupled with means 40 e.g. motor means, for moving orientable parts of the single rear-view devices 30R, 30L (thus, right and left mirrors or shooting devices), for transmitting to the abovementioned devices electrical signals for actuating the local movement means 40R, 40L. Such coupling may occur, for example and advantageously, through cables arranged for the setting (configuration) of the orientation of the rear-view means by the drivers of the vehicle. Communication may occur by means of automotive lines such as CAN, LIN, dedicated digital lines or through analogue lines.

Figure 2:
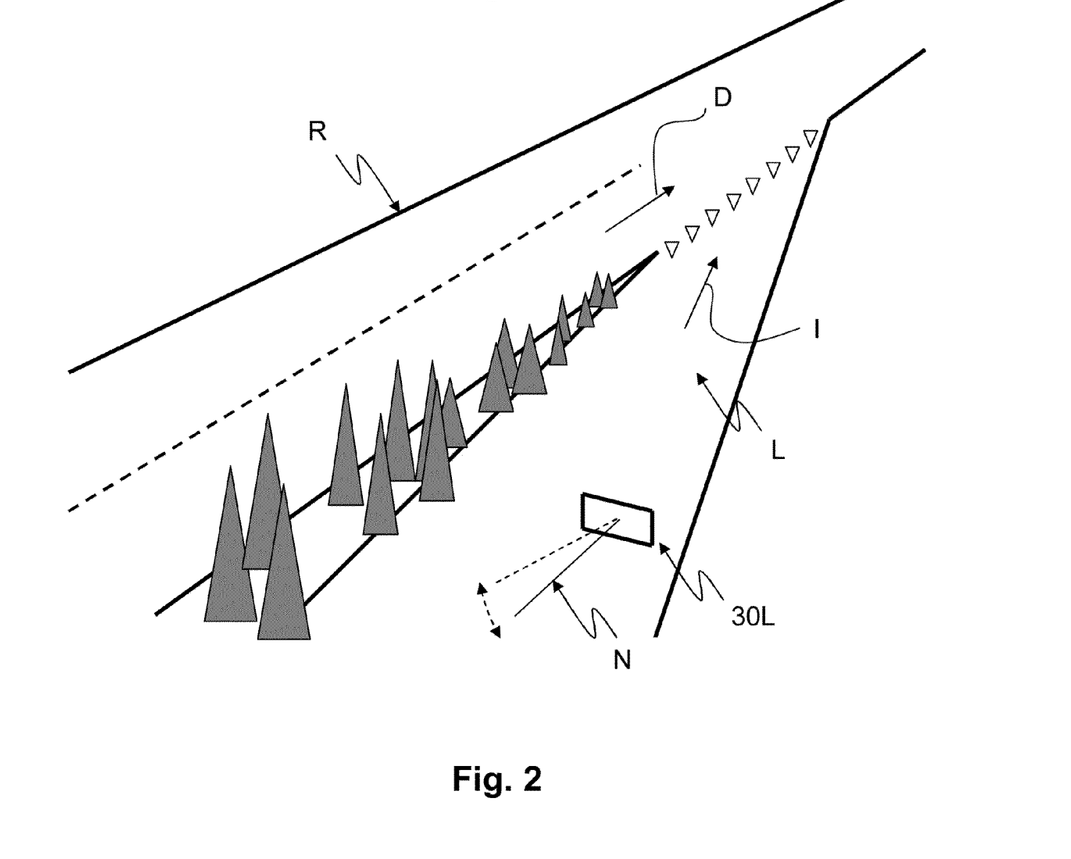
FIG. 2 is a schematic representation of a road intersection.

FIG. 2 shows an example of a road intersection between a road R and a lane L for joining the traffic stream. The main direction of traffic stream along the road R (or rather its lane in the direction corresponding to the direction of joining the traffic stream), identified herein as the destination direction of the manoeuvre to join the traffic stream, is indicated by the arrow D. The direction to join the traffic stream, i.e. the direction of temporary motion followed by the vehicle V in the manoeuvre to join the traffic stream from the lane L into the road R, is indicated by the arrow I. The direction I to join the traffic stream and the destination direction D are incident according to an acute angle α, in case of interchanges or interurban junctions, in which the intersections are built to be engaged by vehicles without stopping.

In the description hereinafter the general definition of "lane or incident road" or "incident direction" shall indicate a lane, road or direction that is incident with respect to a lane, road or direction taken as reference in the context. For example, in the case of a vehicle travelling along a lane L to join the traffic stream (according to the direction I) in order to join the traffic stream in a road R in a destination direction D, assuming a reference system "centred" on the vehicle moving through the lane L to join the traffic stream, or on its travel direction, shall be defined as the direction incident the destination direction D. On the contrary, acquiring a reference system "centred" on the road R, the incident direction shall be the direction I to join the traffic stream, i.e. the travel direction of the vehicle along the lane L joining the road R.

Also schematically represented (not in scale) in FIG. 2 is a rear-view device 30L in a travel direction of orientation, referring to the normal axis N in case of a flat reflecting surface. Indicated with the dashed line is a desired modified direction of orientation, that the mirror should acquire in proximity to an intersection to allow the driver a better view of the incident lane (in this case, according to the definition above, the main travel road R).

Figure 3:
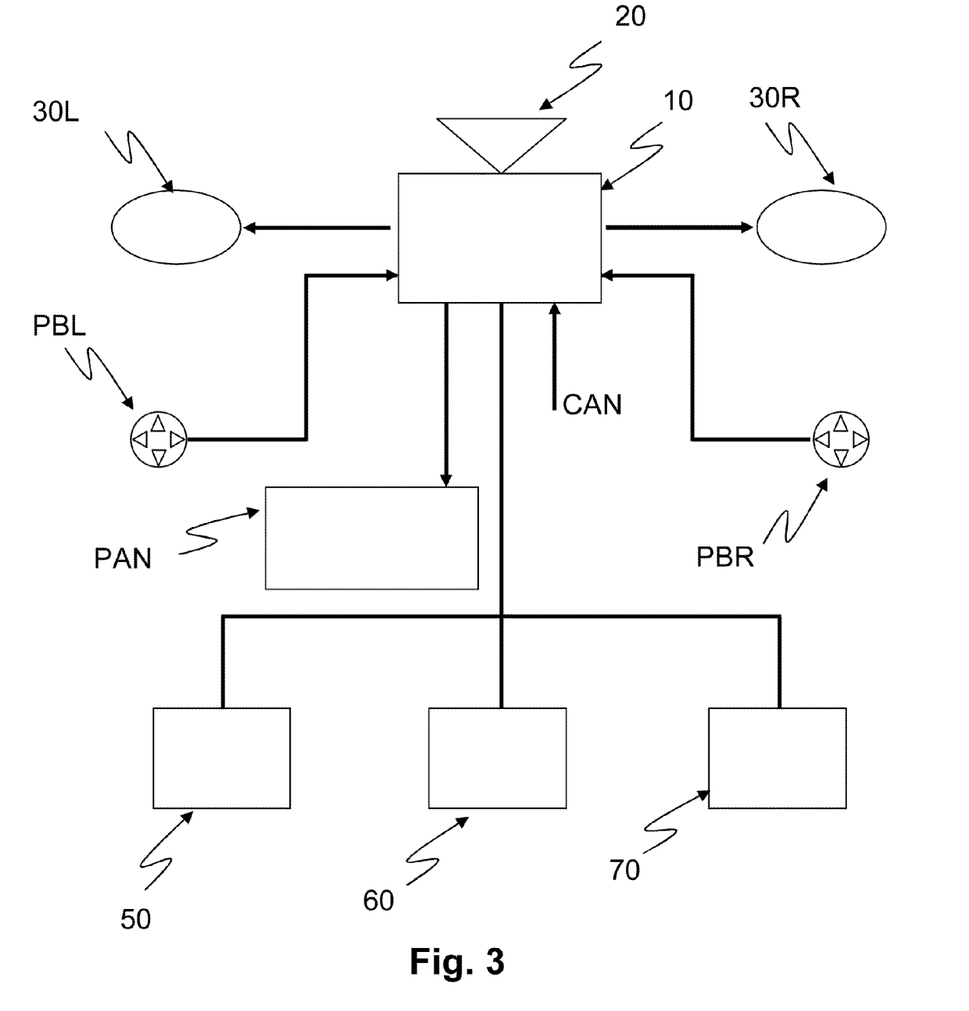
FIG. 3 is a block diagram of the system subject of the invention.

A detailed diagram of the system subject of the invention is illustrated in FIG. 3. Identical elements or components, or functionally equivalent to the ones illustrated in FIGS. 1 and 2 were indicated with the same alphanumeric reference numbers. Highlighted are directional control buttons PBR, PBL for the automatic setting of the orientation of the rear-view means, respectively right and left, adapted to impart a movement command to the mirrors (or to the shooting means) to represent to the driver the incident lane or road. Also represented is the active part of control of the vehicle dynamics, specifically the processing modules for controlling the engine 50, braking 60 and steering 70 to which the processing unit 10 of the system subject of the invention can send information with a view to an active control of the vehicle.

The processing unit 10 is also connected to an on board network, for example a CAN network for communicating the information regarding the status of the vehicle.

Lastly, shown is a control panel PAN, for example representable digitally in the on board panel or in another location arranged for communicating information to the driver when setting the system or resetting/modifying the same, adapted to represent the different configurations that the system may acquire, which shall be fully described hereinafter.

Figure 4:
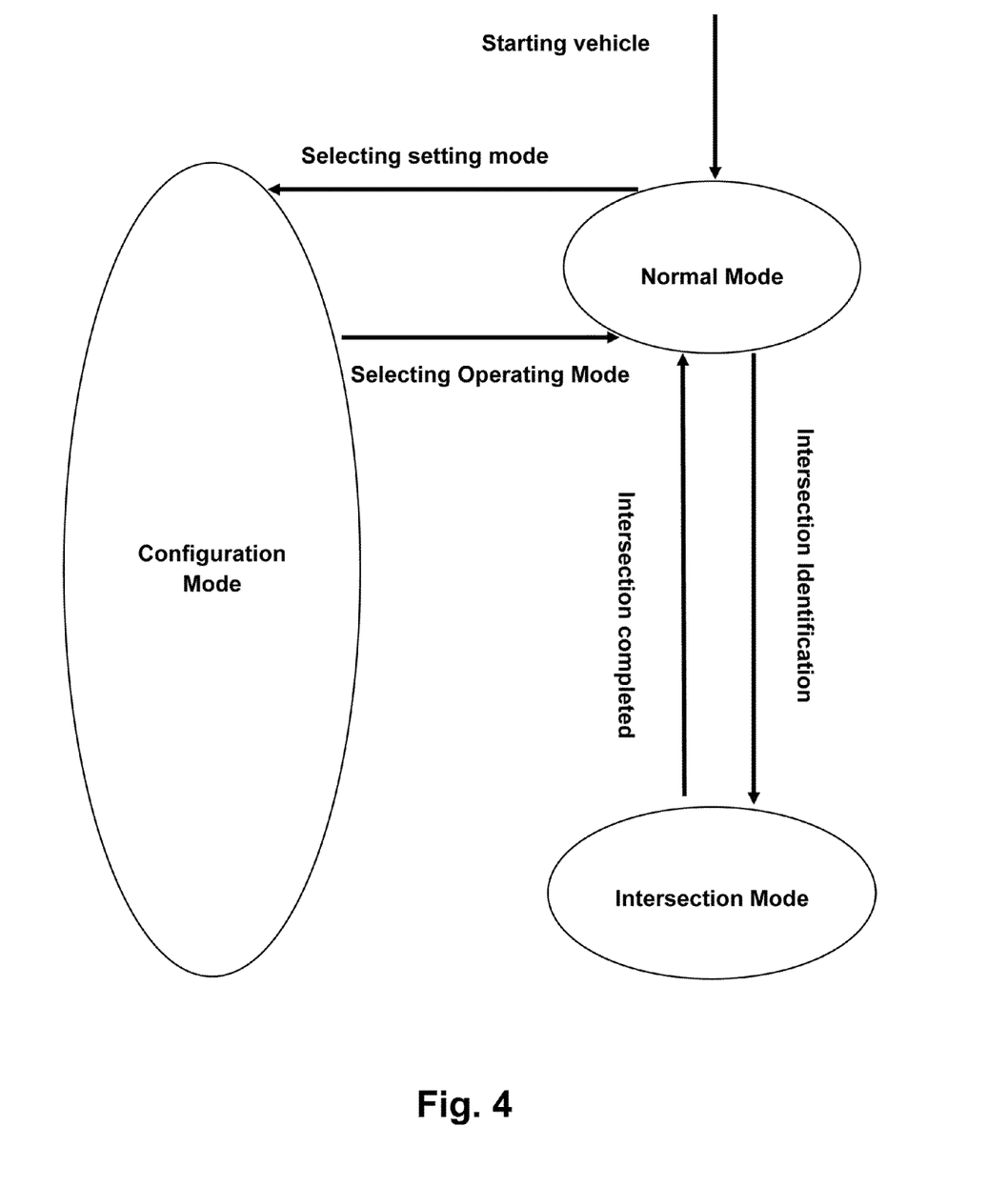
FIG. 4 is a state diagram representing a high level management of the operating modes of the system subject of the invention.

FIG. 4 shows a status diagram representing the high level management of the operation modes of the system subject of the invention by the processing unit 10.

The system provides for three operation modes, respectively a configuration mode, an automatic orientation mode for normal travel (briefly, Normal Mode) and an automatic orientation mode for travel in proximity to intersections (briefly, intersection assistance mode).

Upon starting the vehicle the system is arranged in the Normal Mode wherein the rear-view means are oriented according to the settings desired by the driver to allow him to view the scene at the rear of the vehicle. The processing unit 10 executes a programme stored for identifying road intersections, using images acquired by the shooting means.

Upon identification of the intersections, the finite state machine (the processing unit 10) switches to the Intersection Assistance Mode state, whereby the rear-view device on the side of joining the traffic stream in the destination road, controlled by the processing unit, is oriented in such a manner to guarantee the visibility of a rear and lateral scene with respect to the vehicle, comprising the destination direction. In order to avoid creating hazardous situations, the automatic modification of the orientation of a rear-view device is advantageously active only upon reaching a threshold distance from the intersection, for example in the order of 10-15 m therefrom, when the speed of the vehicle is presumably low.

At any time, when the system operates in Normal Mode (suitably signalled on the on board panel or on a dedicated panel), the orientation of the rear-view devices may be set according to the personal driving style and the view requirements, through the control buttons PBL, PBR, in a Configuration Mode of the state machine where the unit 10 shall be capable of storing the established settings, to be referred to each time the assisted manoeuvre to join the traffic stream is completed.

Figure 5:
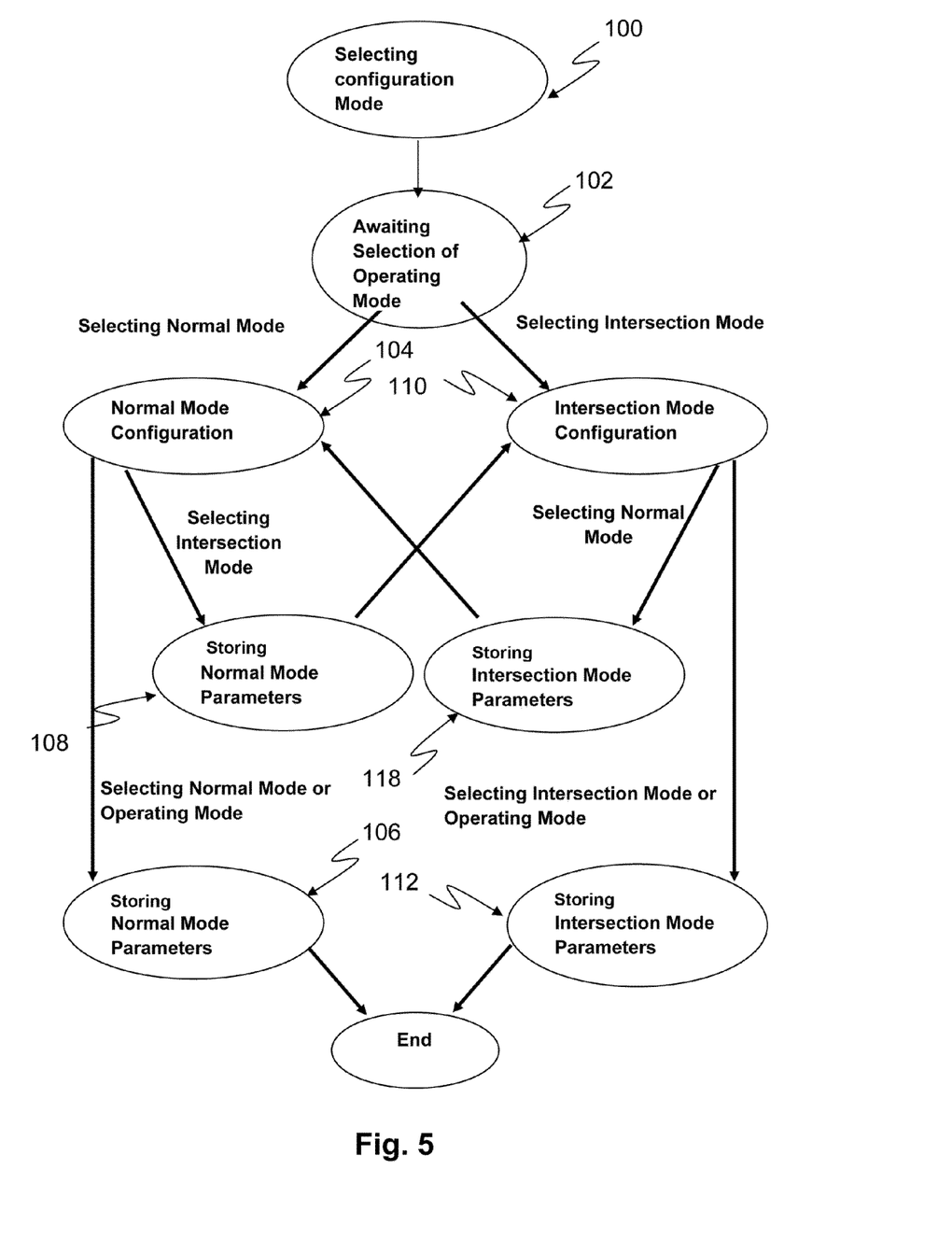
FIG. 5 is a state diagram representing the configuration mode of the system subject of the invention.

FIG. 5 is a status diagram representing the Configuration Mode of the system. The system enters the configuration mode when requested by the driver, for example by pressing a button or selecting a setting function provided for by a cockpit operating menu represented in the instrument panel (state 100). The system thus awaits in state 102 for the operation mode to be configured to be selected, respectively by selecting the Normal Mode or the Intersection Assistance Mode.

In the Normal Mode configuration (state 104 called Normal Mode Configuration) through buttons PBL, PBR the desired orientation of the rear-view devices is set in the normal drive conditions, i.e. for representing to the driver the rear and partly side scene (from the driver's side and the opposite side) with respect to the vehicle. The memorisation of the set orientation parameters occurs by setting the operation mode to be configured or the operating mode again, whereby the system passes to state 106 (Memorisation of Normal Mode parameters), or by selecting—within the configuration mode—the Intersection Assistance Mode, whereby the system passes to state 108 for memorising the parameters (Memorisation of Normal Mode parameters) and then to state 110 for configuring the Intersection Assistance Mode (Intersection Mode Configuration).

In the Intersection Assistance Mode configuration (state 110 called Intersection Mode Configuration) through buttons PBL, PBR the desired orientation of the rear-view devices is set in the conditions of approaching and/or entering an intersection, i.e. for representing to the driver the rear and lateral scene (on the driver's side and on the opposite side) with respect to the vehicle along the destination direction. These settings shall be maintained only in a first phase of approaching the intersection, i.e. when identifying the intersections (for example possibly coinciding with an orientation of the rear-view device according to the maximum admissible angle with respect to the travel direction of the vehicle), leaving the control on the orientation of the device to a module for calculating and activating the movement that operates an actual tracking of the adjustment in the phase of entering the intersection. The memorisation of the set orientation parameters occurs by selecting the operation mode to be configured or the operating mode again, whereby the system passes to state 112 (Memorisation of Intersection Mode Parameters), or by selecting—within the configuration mode—the Normal Mode, whereby the system passes to state 118 for memorising the parameters (Memorisation of Intersection Mode Parameters) and then to state 104 for configuring the Normal Mode (Normal Mode Configuration).

Figure 6:
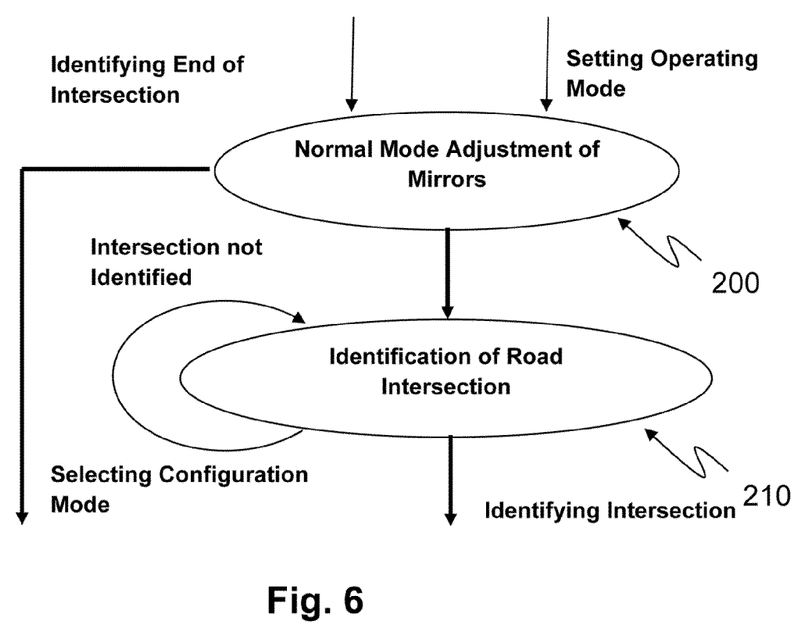
FIG. 6 is a state diagram representing the Normal Mode of the system subject of the invention.

FIG. 6 is a state diagram representing the Normal Mode of the system subject of the invention.

In the Normal operating mode, the rear-view devices assume the position determined by the configuration set for the Normal Mode. Such state, identified with 200 in the figure, may be attained upon the identification of the end of an intersection, thus at the exit from an Intersection Assistance Mode state (shown in FIG. 7 and described hereinafter), or upon exiting from the configuration mode, i.e. upon selecting the operating mode (states 106 or 112 in FIG. 5).

From state 200 it is always possible to select the configuration mode by pressing the corresponding button, present on the panel PAN, conveniently actuatable only with the vehicle not in motion, returning to the initial state of the diagram of FIG. 5.

The system actuates shooting means 20 for shooting scenes of the environment surrounding the vehicle, in particular in the travel direction of the vehicle. The processing unit 10 receives the shot images and performs a procedure for identifying the same, to identify a road intersection.

The processing unit periodically processes the identification of images, on frames separated by a predetermined time interval, ensuring a frame rate ranging from 30 to 60 Hz.

The identification of a road intersection is performed in state 210 (Road Intersection Identification) and it is based on the identification of a collection of predetermined shapes representative of a road intersection. Specifically, in an image is searched at least one from among the shapes of the set comprising:

The vertical sign indicating an obligation to stop (STOP sign);
The vertical sign indicating the obligation to give priority (PRIORITY sign);
The horizontal sign indicating an obligation to stop (transverse line and/or STOP writing/pictogram);
The horizontal sign indicating an obligation to give priority (continuous transverse line or made up of a series of triangles);
Vertical light sign indicating a controlled intersection (traffic light);
The horizontal sign delimiting the travel lane or lane for joining the traffic stream;
The horizontal sign delimiting the lane or destination road.

The processing unit, in state 210, is thus adapted to identify geometric shapes such as triangles, circles and rectangles; writings; lines or horizontal, longitudinal and transverse lines (white bands on dark backgrounds). Advantageously, the processing unit operates executing one or more modules or distinct application programmes, each intended to identify a respective category of shape or indicia of a road intersection, preferably combined together to guarantee high reliability on the correct detection of a road intersection. Conveniently, starting from the identification of the travel lane, essentially based on a traditional algorithm of Lane Departure Warning (LDW), information is extracted regarding the width of the lane occupied by the vehicle, useful for consequently searching possible writings or pictograms of interest on the road surface, vertical signs at the sides of the road, light signals at the sides of the road or in raised position at the centre thereof.

A first condition required to identify the presence of an intersection is the detection of a second road, i.e. a destination road. The identification of the lane or destination road (R, in FIG. 2) is based on the principle that the lane traveled by the vehicle or lane for joining the traffic stream (I, in FIG. 2) is interrupted at one side, where intersection with the destination road occurs. The processing unit is thus adapted to detect a discontinuity of the signs for delimiting the travel lane on one side thereof and verify the presence of an intersecting (or rather incident) delimiting line that defines the direction of the destination road. Conveniently, the identification of an interruption of the lines delimiting the lane contributes to determine an image region (or scene) where the searching for other shapes (vertical sign of road signs, writings, light signs) is to be carried out.

A second condition necessary to detect a road intersection, alongside identifying the travel road (joining the traffic stream) and the destination road, is the identification of at least one from among the following conditions:
Presence of stop signs;
Presence of priority signs;
Presence of light signs (traffic light).

In order to identify the shapes, the module 210 may for example be implemented with suitably configured neutral networks, alongside combining with traditional identification algorithms based on a Hough transform and others present in the literature.

Figure 7:
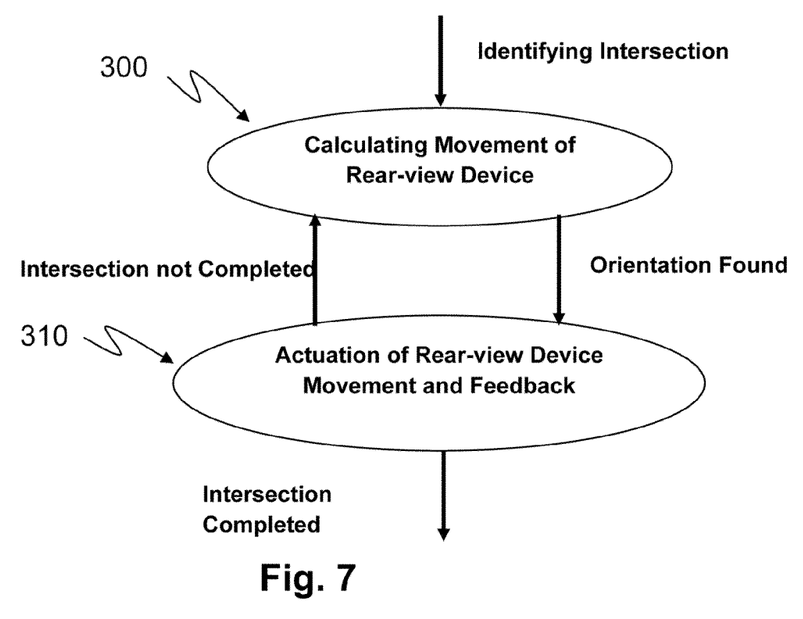
FIG. 7 is a state diagram representing the driving assistance mode of the system subject of the invention.

Should both conditions occur, the finite state machine evolves from state 210 (Road Intersection Identification) from Normal Mode to Intersection Mode, into state 300 (rear-view device movement calculation).

FIG. 7 is a state diagram representing the Intersection Assistance Mode.

Upon identifying the intersection and the related side for joining the traffic stream in state 210, the finite state machine enters into state 300 of Calculation of the rear-view device movement. According to the processing, identification of the junction and identification of the coordinates on the road surface, performed in state 210 Road Intersection Identification, the processing unit in state 300 calculates the correct orientation of the rear-view device towards the incident road through trigonometric calculations, then, in state 310 (feedback activation), the calculated orientation is performed by operating the movement of the device, and possibly providing visual and/or sound feedback to the driver of the vehicle by means of warning lights, signals on the instrument panel, or the sound of a buzzer.

The orientation depends on the angle of incidence between the direction to join the traffic stream and the destination direction.

For this it is necessary to use information coming from the vehicle through the CAN connection or any other dedicated bus, such as the current driving speed and steering angle, in such a manner to track the images coming from the shooting means and have locked and continuous information regarding the development of the lane to join the traffic stream, typically a progressive junction with variable curvature or clothoid.

Figure 8:
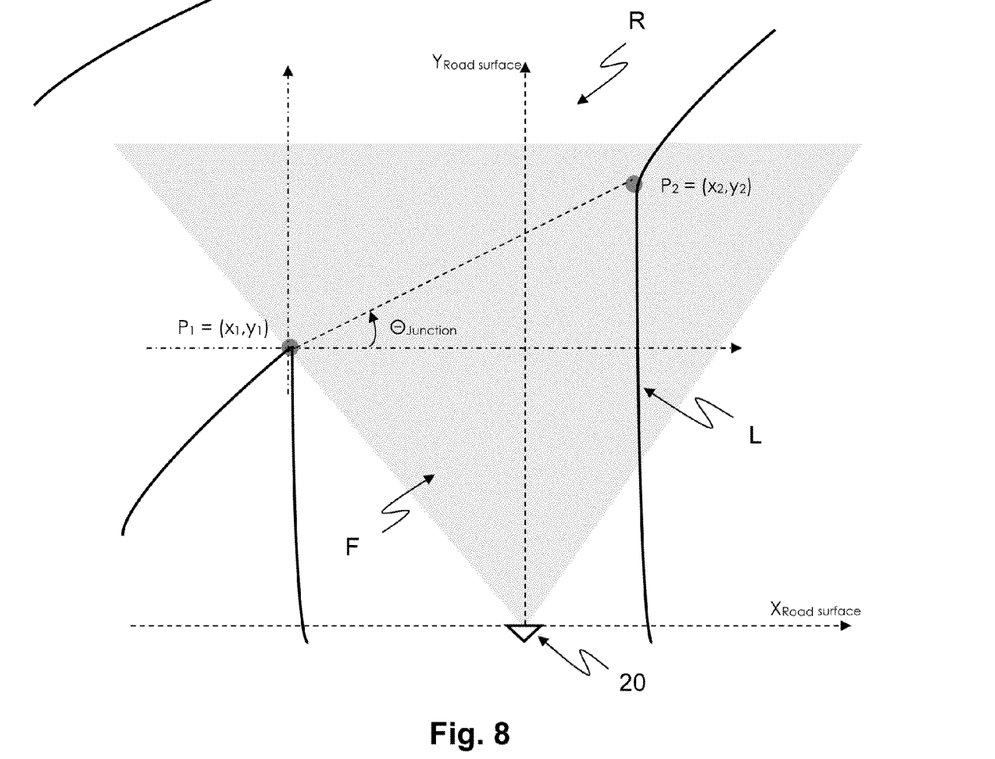
FIG. 8 is a geometric representation of the calculation of the orientation of the rear-view means implemented by the system subject of the invention.

The calculation of the orientation is described with reference to the geometric representations of FIGS. 8 and 9. As mentioned, the intersection is characterised in that it has a discontinuity on one side of the traveled road (the lane to join the traffic stream L). In state 210, plotting the shot image on the road surface using techniques well known to the art, upon determining the extreme points $P_1$, $P_2$ that define the discontinuity (for example, where the change of the line section delimiting the road lane occurs) it is possible to calculate the distances present between the shooting means in state 300, ideally point wise, i.e.—approximately—from the vehicle ($x_1$, $x_2$; $y_1$, $y_2$ in FIG. 8). Calculating a mean value between the abovementioned distances, given the current speed of the vehicle in module and direction, the Time To Connection is obtained.

Knowing the coordinates of the two points, $P_1=(x_1, y_1)$ and $P_2=(x_2, y_2)$, in state 300, the direction of the incident road is further obtained, i.e. the $\theta_{Junction}$ angle, according to the relation:

$$\theta_{Junction} = \arctan\left(\frac{y_2 - y_1}{x_2 - x_1}\right)$$

The $\theta_{Junction}$ angle being defined by convention as the angle between the destination direction D (equivalent to the direction indicated by the line delimiting the lane or destination road R) and the direction orthogonal to the direction of joining the traffic stream I (or travel direction) of the vehicle. Such parameter is fundamental to define the rotation to be imposed to the rear-view device with respect to the transverse axis of the vehicle.

Figure 9:
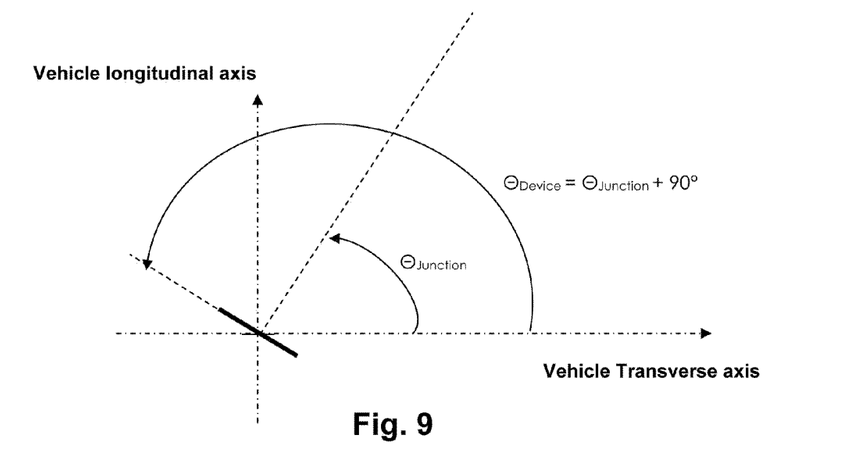
FIG. 9 is a geometric representation of the movement of a rear-view device in the system subject of the invention.

The rear-view device in question shall be oriented by the processing unit 10 operating on the movement means 40 in such a manner to show to the driver the destination road R, hence imposing a rotation of the axis of the device by an angle equivalent to $$\theta_{Device} = \theta_{Junction} + 90°$$

as indicated in FIG. 9.

Upon estimating the orientation of the rear-view device in state 300, the finite state machine switches to state 310 of Activating mirror movement feedback which comprises the physical adjustment (movement) of the rear-view device according to the angular indications obtained from the processing at state 300, alongside generating visual and sound feedbacks.

The identification process of points $P_1$ and $P_2$ (through tracking) and movement of the rear-view device are always iterated until the vehicle reaches the destination direction D (i.e., until it enters the destination road R); at the end of the junction the system returns to operating in the Normal Mode. This condition is, for example, identified by the absence of discontinuity of the signs delimiting the lane, the signs delimiting an incident lane or road and by the end of the signs encountered previously.

In a further improved embodiment, an active driving assistance system may be configured if it is decided to use the information of presence of the intersection to operate on the vehicle speed in an automatic manner, using the distance information obtained from the image processing operation and the dynamic data available on board, providing controls to the processing modules for controlling the engine 50, braking 60 and steering 70. In this case, the active system takes the control of the engine as well as of the braking and steering systems according to the time information regarding the Time To Connection TTC, to the distance of the intersection and to the speed of the vehicle. The system may be voluntarily activated by activating direction indicator devices.

Advantageously, the system could be further enhanced through additional information coming from sensors such as radars or lidars, or from digital maps, to integrate any deficiency in shooting at night or under harsh whether conditions (heavy rain, fog, . . . ).

Obviously, without prejudice to the principal of the invention, the construction embodiments and details may widely vary with respect to the description outlined and illustrated above strictly for exemplifying and non-limiting purposes, without for this reason departing from the scope of protection of the invention defined by the attached claims.

What is claimed is:

1. System for automatic adjustment of rear-view means of a vehicle travelling a lane or road, comprising:
   means for shooting scenes representing the lane or road travelled by the vehicle including lane or road lines, substantially facing a direction of travel of the vehicle;
   means for processing images, arranged to identify in a shot scene at least one from among a collection of predetermined shapes or indicia representing lane or road lines along the lane or road indicating a road intersection between the lane or road travelled by the vehicle and an incident lane or road, said means for processing being arranged to identify a travel lane of the vehicle and to detect an incident road;
   means for controlling automatic adjustment of orientation of the rear-view means, adapted to impart a control for movement of at least one rear-view device of said rear-view means upon determination of a road intersection, for representing to a driver a rear and side scene with respect to the vehicle comprising the incident lane or road;

means for calculating an angle of an intersection in the shot scene, and based on the angle of the intersection, calculating a correct orientation of the rear view means towards the incident road upon identifying the intersection;

means being arranged for imparting control for the movement of at least one rear-view device of said rear-view means according to a calculated orientation in such a manner to guarantee visibility of a rear and lateral scene with respect to the vehicle comprising the incident lane or road.

2. System according to claim 1, wherein said collection of shapes comprises:
horizontal or vertical lines indicating a controlled intersection;
horizontal lines delimiting the lane of travel or joining a traffic stream; and
horizontal lines delimiting a destination lane or road.

3. System according to claim 1, wherein said processing means are arranged for:
detecting a discontinuity of lines delimiting the lane travelled by the vehicle, adapted to determine an image region of the scene, subjected to a search for shape and indicia indicating an intersection;
(ii) verifying, at said discontinuity, the presence of lane or road lines delimiting an incident lane or road; and
verifying, after having met the conditions (i) and (ii), the presence of lane or road lines of a controlled intersection.

4. System according to claim 3, wherein said processing means are arranged for calculating an orientation angle of the rear-view means, as a function of the incidence angle between a direction of joining the traffic stream of the lane or road travelled by the vehicle and a destination direction of the incident lane or road and impose a rotation of the rear-incidence angle between a direction of joining the traffic stream of the lane or road travelled by the vehicle and a destination direction of the incident lane or road and impose a rotation of the rear-view means by an angle $\theta_{Device}$ equivalent to $$\theta_{Device}=\theta_{Junction}+90°$$

$\theta_{Junction}$ being the angle between the destination direction and the direction orthogonal to the direction of joining the traffic stream.

5. System according to claim 4, wherein said processing means are arranged for performing iterations of the calculation of the orientation angle of the rear-view means up to obtaining the destination direction, the obtaining the destination direction being identified by the absence of discontinuity of the lines delimiting the lane travelled by the vehicle, the absence of lines delimiting an incident lane or road, and an end of the lines indicating a controlled intersection, encountered previously.

6. System according to claim 1, wherein said control means are adapted to operate when a threshold distance from the intersection is reached and/or at a speed of the vehicle lower than a predetermined threshold speed for entering the intersection.

7. System according to claim 1, further comprising a predefined configuration of the orientation of the rear-view means under normal travel conditions and in a phase of approaching the intersection.

8. System according to claim 1, wherein said rear-view means include at least one from among a first external rear-view mirror on a side of the vehicle close to the driver, a second external rear-view mirror on a side of the vehicle opposite to the driver, and a video camera facing the side and/or the rear with respect to the vehicle.

9. Method for automatic adjustment of rear-view means of a vehicle travelling a lane or road, comprising:
shooting scenes representing an environment surrounding the vehicle including the lane or road travelled on by the vehicle and lane or road lines, substantially in a travel direction of the vehicle;
identifying, in a shot scene, at least one from among a collection of predetermined lane or road lines along the lane or road indicating a road intersection between the lane or road travelled by the vehicle and an incident lane or road, including identifying a travel lane of the vehicle and detecting an incident road;
calculating an angle of an intersection in the shot scene, and based on the angle of the intersection, calculating a correct orientation of the rear-view means towards the incident road upon identifying the intersection; and
automatically adjusting the orientation of the rear-view means by imparting a control for movement of at least one rear-view device of said rear-view means according to the calculated correct orientation for representing to a driver a rear and side scene with respect to the vehicle comprising the incident lane or road.

10. Method according to claim 9, wherein the identification of at least one from among a collection of lane or road lines comprises:
the identification of a horizontal or vertical line indicating a controlled intersection;
the identification of a horizontal line delimiting the lane of travel or joining a traffic stream; and
the identification of a horizontal line delimiting a destination lane or road.

11. Method according to claim 9, comprising:
(i) detection of a discontinuity of lines delimiting the lane travelled by the vehicle, adapted to determine an image region of the scene subjected to a search of the lane or road lines indicating an intersection;
(ii) verifying, at said discontinuity, the presence of lines delimiting an incident lane or road; and
verifying, after having met the conditions (i) and (ii), the presence of the line of a controlled intersection.

12. Method according to claim 11, comprising the calculation of an orientation angle of the rear-view means, as a function of the angle of incidence between a direction of the lane or road travelled by the vehicle of joining a traffic stream and a destination direction of the incident lane or road, and the imposition of a rotation to the rear-view means by an angle $\theta_{Device}$ equivalent to $$\theta_{Device}=\theta_{Junction}+90°$$

$\theta_{Junction}$ being the angle between the destination direction and the direction orthogonal to the direction of joining the traffic stream.

13. Method according to claim 12, comprising an iteration of the calculation of the orientation angle of the rear-view means up to obtaining the destination direction, the obtaining the destination direction being identified by an absence of the discontinuity of lines delimiting the lane travelled by the vehicle, the absence of the lines delimiting an incident lane or road, and at the end of the lines of a controlled intersection encountered previously.

14. Method according to claim 9, comprising automatic adjusting the orientation of the rear-view means upon reaching a threshold distance from the intersection and/or at a speed of the vehicle lower than a predetermined threshold speed of entering the intersection.

15. Method according to claim 9, further comprising a predefined configuration of the orientation of the rear-view means under normal travel conditions and in a phase of approaching the intersection.

\* \* \* \* \*